(12) United States Patent
Waki et al.

(10) Patent No.: US 8,383,075 B2
(45) Date of Patent: Feb. 26, 2013

(54) MANUFACTURING METHOD OF HEXAFLUOROPHOSPHATE

(75) Inventors: Masahide Waki, Izumiotsu (JP);
Kazuhiro Miyamoto, Izumiotsu (JP);
Kenji Aoki, Izumiotsu (JP)

(73) Assignee: Stella Chemifa Corporation, Osaka (JP)

( * ) Notice: Subject to any disclaimer, the term of this patent is extended or adjusted under 35 U.S.C. 154(b) by 746 days.

(21) Appl. No.: 12/525,900

(22) PCT Filed: Feb. 5, 2008

(86) PCT No.: PCT/JP2008/051806
§ 371 (c)(1),
(2), (4) Date: Aug. 5, 2009

(87) PCT Pub. No.: WO2008/096723
PCT Pub. Date: Aug. 14, 2008

(65) Prior Publication Data
US 2010/0317511 A1    Dec. 16, 2010

(30) Foreign Application Priority Data
Feb. 8, 2007 (JP) ................................ 2007-029405

(51) Int. Cl.
*C01B 25/10* (2006.01)
*H01M 6/04* (2006.01)
*B01J 27/24* (2006.01)
*B01J 27/00* (2006.01)

(52) U.S. Cl. ......... 423/301; 429/199; 502/200; 502/208

(58) Field of Classification Search .................... None
See application file for complete search history.

(56) References Cited

U.S. PATENT DOCUMENTS

| | | | |
|---|---|---|---|
| 2,488,298 A | 11/1949 | Lange et al. | |
| 2,488,299 A * | 11/1949 | Lange et al. | ................. 423/301 |
| 3,401,013 A | 9/1968 | Rohlfs et al. | |
| 5,378,445 A | 1/1995 | Salmon et al. | |
| 6,322,764 B1 * | 11/2001 | Smith et al. | ................... 423/301 |
| 6,540,969 B1 | 4/2003 | Smith et al. | |
| 6,955,795 B2 * | 10/2005 | Kikuyama et al. | ............ 423/301 |
| 2001/0041158 A1 | 11/2001 | Smith et al. | |
| 2006/0040180 A1 | 2/2006 | Ivanov et al. | |
| 2009/0081559 A1 | 3/2009 | Oe et al. | |

FOREIGN PATENT DOCUMENTS

| | | |
|---|---|---|
| JP | 63-045108 | 2/1988 |
| JP | 05-072324 | 3/1993 |
| JP | 5-279003 A | 10/1993 |
| JP | 6-56413 A | 3/1994 |
| JP | 9-506329 | 6/1997 |
| JP | 10-081505 | 3/1998 |
| JP | 2004-075413 A | 3/2004 |
| JP | 2005-507849 A | 3/2005 |
| JP | 2006-302590 A | 11/2006 |
| WO | WO 2006/115025 A1 | 11/2006 |

OTHER PUBLICATIONS

Lange, Fluorine Chemistry, vol. 1, 1950, pp. 164-167.
Supplementary European Search Report for Application No. EP 08704433, completed on Feb. 24, 2012.
Office Action mailed Jun. 19, 2012 issued in corresponding Japanese Application No. 2007-029504.
Written Opinion issued in Singapore patent application No. 2009052440 on Jul. 22, 2010.

* cited by examiner

*Primary Examiner* — Melvin C Mayes
*Assistant Examiner* — Bijay Saha
(74) *Attorney, Agent, or Firm* — Knobbe Martens Olson & Bear LLP

(57) ABSTRACT

In the manufacturing method of hexafluorophosphate ($MPF_6$: M=Li, Na, K, Rb, Cs, $NH_4$, and Ag) of the present invention, at least a $H_xPO_yF_z$ aqueous solution, a hydrofluoric acid aqueous solution, and MF.r (HF) are used as raw materials (wherein, $r \geq 0$, $0 \leq x \leq 3$, $0 \leq y \leq 4$, and $0 \leq z \leq 6$). According to the above description, a manufacturing method of hexafluorophosphate can be provided which is capable of manufacturing hexafluorophosphate ($GPF_6$: G=Li, Na, K, Rb, Cs, $NH_4$, and Ag) at a low cost in which the raw materials can be easily obtained, the control of the reaction is possible, and the workability is excellent.

11 Claims, No Drawings

MANUFACTURING METHOD OF HEXAFLUOROPHOSPHATE

This application is the U.S. National Phase under 35. U.S.C. §371 of International Application PCT/JP2008/051806, filed Feb. 5, 2008, which claims priority to Japanese Patent Application No. 2007-029405, filed Feb. 8, 2007. The International Application was published under PCT Article 21(2) in a language other than English.

TECHNICAL FIELD

The present invention relates to a manufacturing method of hexafluorophosphate that is useful as an electrolyte for a battery, a catalyst for an organic synthesis reaction, etc.

BACKGROUND ART

Hexafluorophosphate $DPF_6$ (D=Li, Na, K, etc.) is used as the electrolytic liquid of a battery. Additionally, in the case of D=Ag, it has attracted attention as a counter ion that generates acid necessary for an initiation reaction in photo polymerization and a growth reaction. Furthermore, in the case of D=$NH_4$, it is useful as a raw material that is used in the manufacturing of medicine intermediates.

Hexafluorophosphate $DPF_6$ in a solid state is a compound that is generally unstable in water. When moisture exists in the reaction system, oxyfluorophosphate ($DPO_aF_b$) is produced as a by-product and hexafluorophosphate is decomposed into DF or DF.c (HF). Among those, especially when lithium hexafluorophosphate, silver hexafluorophosphate, etc. are left in air, they decomposes gradually while generating white smoke ($POF_3$ and HF) due to a very small amount of moisture. This decomposition occurs even with only a few ten ppm of moisture, and the moisture changes into 2 times equivalent or more of an acid component (HF, $HPO_2F_2$, $H_2PO_3F$, etc.)

For this reason, conventionally, hexafluorophosphate is generally obtained by producing phosphorous pentafluoride ($PF_5$) by reacting anhydrous hydrogen fluoride with phosphorous halide, for example, phosphorous pentachloride ($PCl_5$), and further by reacting the generated $PF_5$ with metal fluoride (DF or DF.c (HF)) in anhydrous hydrogen fluoride.

However, because a solid having moisture absorbing property and smoke-generating property, so-called phosphorus pentachloride, is used in this method and a large amount of hydrogen chloride gas is generated during the reaction, this method has a disadvantage that workability is poor such that treatment of the generated gas has to be performed.

On the other hand, it is also known that the disaggregated hexafluorophosphate anion ($PF_6^-$) is also stable in an aqueous solution. This is because a complex with a water molecule is formed where a stable coordination compound such as water exists. However, it is difficult to extract also the hexafluorophosphate anion that is stable in a solution due to water existing in a solution as hexafluorophosphate that is an anhydrous solid.

For example, $NaPF_6$ exists as a stable $PF_6^-$ in a solution when it is dissolved in water. However, in the case of extracting this as a crystal with a method such as recrystallization, $NaPF_6$ deposits in a state of $NaPF_6 \cdot H_2O$ that is a hydrate, not as $NaPF_6$ that is an anhydride. Furthermore, when heating or drying under reduced pressure is performed to dehydrate water content of this $NaPF_6 \cdot H_2O$, a part of hexafluorophosphate is decomposed into oxyfluorophosphate. The same decomposition also occurs in $NH_4PF_6$, $AgPF_6$, and $LiPF_6$, and especially it is remarkable in the case of $LiPF_6$ and $AgPF_6$, which are decomposed into oxyfluorophosphate even when a small amount of a hydrate exists. For this reason, a report that $LiPF_6$, $NaPF_6$, $NH_4PF_6$, and $AgPF_6$ have been synthesized in an aqueous solution system has not existed yet.

As described above, although hexafluorophosphate $DPF_6$ is unstable in water, in the case of D=K (potassium) ($KPF_6$), a crystal is successfully extracted as a solid even under the existence of a small amount of water. For example, the following Patent Document 1 describes a manufacturing method of $KPF_6$ by manufacturing a hexafluorophosphoric acid solution with reaction of anhydrous hydrogen fluoride with phosphorus pentaoxide, and then by reacting with a potassium salt such as potassium fluoride and potassium hydroxide.

However, with this method, because the reaction of phosphorous pentaoxide with anhydrous hydrogen fluoride is violent, it is very dangerous and control of the reaction is extremely difficult. Furthermore, it has a disadvantage that workability is poor such that phosphorus pentaoxide that has very strong moisture absorbing property is handled.

Then, in the following Patent Document 2, potassium hexafluorophosphate is synthesized by reacting with a potassium compound of phosphoric acid (potassium dihydrogen phosphate or potassium polyphosphate) using hydrofluoric acid of 60 to 97% by weight even without using anhydrous hydrogen fluoride. However, it is described in this method that although the reaction is not as violent as phosphorus pentaoxide, the temperature of the solution increases as the reaction proceeds when adding a potassium salt into hydrofluoric acid. Furthermore, a synthesis of rubidium hexafluorophosphate and cesium hexafluorophosphate may be possible if this method is applied. However, in this case, because rubidium dihydrogen phosphate, cesium dihydrogen phosphate, rubidiumpolyphosphate, and cesium polyphosphate cannot be easily obtained, it is hard to say that it is a practical method.

On the other hand, hexafluorophosphoric acid ($HPF_6$) is synthesized as in the following chemical reaction Formula 4 or 5 according to the following Patent Document 3. This is because water is coordinated in $HPF_6$ and $HPF_6$ is stabilized.

$$H_3PO_4 + 6HF \rightarrow HPF_6 + 4H_2O \quad \text{(Formula 4)}$$

$$P_2O_5 + 12HF \rightarrow 2HPF_6 + 5H_2O \quad \text{(Formula 5)}$$

However, the extraction of $HPF_6$ as a crystal (a solid) is not performed in this technique, and it is discussed only as a solution of $HPF_6$.

Furthermore, in the following Patent Document 4, $PF_5$ gas is generated by utilizing $HPF_6$. However, the extraction of $HPF_6$ as a crystal (a solid) is not performed in the technique as well.

Furthermore, in the following Patent Document 3, 4, etc., there is a description of $HPF_6 \cdot 6H_2O$, $HPF_6 \cdot 4H_2O$, and $HPF_6 \cdot 2H_2O$. However, it is not described that these are a crystal (a solid) and it can be read from the description that they are a coordination number in the solution. That is, it is considered to be very difficult to easily extract hexafluorophosphoric acid as a crystal (a solid) from a hexafluorophosphate anion ($PF_6^-$) solution.

[Patent Document 1] U.S. Pat. No. 2,488,299
[Patent Document 2] Japanese Examined Patent Publication No. 5-72324
[Patent Document 3] Japanese Unexamined Patent Publication No. 2004-75413
[Patent Document 4] Japanese Translation of a PCT International Patent Application No. 2005-507849

DISCLOSURE OF THE INVENTION

Problems to be Solved by the Invention

The present invention is proposed to solve the problem as described above, and it is an object of the present invention to provide a manufacturing method of hexafluorophosphate that is capable of manufacturing hexafluorophosphate ($APF_6$: A=Li, Na, K, Rb, Cs, $NH_4$, and Ag) at a low cost in which raw materials can be easily obtained, the control of a reaction is possible, and workability is excellent.

Means for Solving the Problems

In order to solve the above problems, the present inventors have performed an intense investigation, and as a result, have found that hexafluorophosphate ($MPF_6$: M=Li, Na, K, Rb, Cs, $NH_4$, and Ag) can be manufactured at a low cost even in an aqueous solution system by using three kinds of a $H_xPO_yF_z$ aqueous solution, a hydrofluoric acid aqueous solution, and MF.r (HF) as raw materials and optimizing the addition ratio of these raw materials and the concentration of the solutions.

The present invention is a manufacturing method of hexafluorophosphate ($MPF_6$: M is at least one kind selected from the group consisting of Ni, Na, K, Rb, Cs, $NH_4$, and Ag) having at least a $H_xPO_yF_z$ aqueous solution, a hydrofluoric acid aqueous solution, and MF.r (HF) as raw materials.

(wherein, $r \geq 0$, $0 \leq x \leq 3$, $0 \leq y \leq 4$, and $0 \leq z \leq 6$)

Effect of the Invention

According to the present invention, the synthesis of hexafluorophosphate $MPF_6$ (M=Li, Na, K, Rb, Cs, $NH_4$, and Ag) can be performed simply and at a low cost because inexpensive raw materials can be used and the handling is very easy.

BEST MODE FOR CARRYING OUT THE INVENTION

In the present invention, it is possible to synthesize $MPF_6$ (M is at least one kind selected from the group consisting of Na, K, Rb, Cs, $NH_4$, and Ag) using at least three kinds of a $H_xPO_yF_z$ aqueous solution, a hydrofluoric acid aqueous solution, and MF.r (HF) as raw materials. However, $r \geq 0$, $0 \leq x \leq 3$, $0 \leq y \leq 4$, and $0 \leq z \leq 6$, preferably $0 \leq x \leq 3$, $0 \leq y \leq 3$, and $0 \leq z \leq 5$, and more preferably $0 \leq z \leq 3$. Moreover, it is obvious that the object can also be achieved using a $H_xPO_yF_z$ aqueous solution and a hydrofluoric acid aqueous solution that are mixed to have a desired composition in advance.

The present invention is preferably carried out according to the next two kinds of methods.

First, as a first method, a $H_xPO_yF_z$ aqueous solution is reacted with a hydrofluoric acid aqueous solution according to the following chemical reaction Formula 1, and then a crystal of a hexafluorophosphoric acid hydrate ($HPF_6 \cdot qH_2O$) is extracted as a solid once. Furthermore, according to the following chemical reaction Formula 2, $MPF_6$ is produced by a reaction of the extracted $HPF_6 \cdot qH_2O$ with MF.r (HF) (wherein, $q \geq 1$, and p is used in an amount of the stoichiometric amount or more).

$$H_xPO_yF_z + pHF \rightarrow HPF_6 \cdot qH_2O \quad \text{(Formula 1)}$$

$$HPF_6 \cdot qH_2O + MF.r\,(HF) \rightarrow MPF_6 + (r+1)HF + qH_2O \quad \text{(Formula 2)}$$

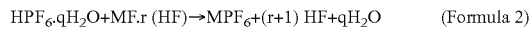

A second method is a method of synthesizing $MPF_6$ by reacting a $H_xPO_yF_z$ aqueous solution, a hydrofluoric acid aqueous solution, and MF.r (HF) at the same time according to the following chemical reaction Formula 3.

$$MF.r\,(HF) + H_xPO_yF_z + sHF \rightarrow MPF_6 + yH_2O \quad \text{(Formula 3)}$$

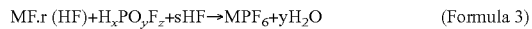

(wherein, s and y are 1 or more, and s is used in an amount of the stoichiometric amount or more)

Examples of the $H_xPO_yF_z$ aqueous solution that is used in the present invention include an aqueous solution in which one or more kinds of pentavalent phosphorous compounds such as $P_2O_5$, $H_3PO_4$, $HPO_3$, $H_4P_2O_7$, $H_5P_3O_{10}$, $H_6P_4O_{13}$, $H_2PO_3F$, $HPO_2F_2$, $POF_3$, and $PF_5$ are dissolved in any one of water or hydrofluoric acid, an aqueous solution that is generated by a reaction of oxyhalogenated phosphorus such as $POCl_3$ and $POBr_3$ with HF, and an aqueous solution that is generated by decomposition of $EPF_6$ (E=H, Li, Na, K, Rb, Cs, and Ag). Furthermore, an aqueous solution that is not reacted in the above chemical reaction Formulas 1 to 3, $H_xPO_yF_z$ that is obtained by recovering and concentrating filtrates, etc. of the chemical reaction Formulas 1 to 3 may be reused. However, $0 \leq x \leq 1$, $1 \leq y \leq 3$, and $0 \leq z \leq 5$, and more preferably $0 \leq z \leq 3$.

The concentration of the $H_xPO_yF_z$ in the above $H_xPO_yF_z$ aqueous solution is preferably 50 to 98% by weight. In a case where the concentration is low, the moisture content in the system becomes large and it leads to lowering the yield. In a case where the concentration is high, the aqueous solution is approaching to be a solid and the handling may become difficult from the viewpoints of moisture absorbing property and the like. Furthermore, because viscosity becomes high even when the aqueous solution does not become a solid, it is especially preferably 75 to 85% by weight. Further, when it is in this range, orthophosphoric acid in which x=3, y=4, and z=0 is common for adding to foods, and a product having high purity can be obtained at a low cost.

The concentration of the hydrofluoric acid that is used during the reactions of the above-described chemical reaction Formulas 1, 2, and 3 is not especially limited. However, when the concentration of the hydrofluoric acid is too low, the generation of a $PF_6^-$ anion becomes difficult, oxyphosphate anions such as a $HPO_2F_2^-$ anion are generated with priority instead, and therefore it is preferably 40% by weight or more. Further, it is preferably 85% by weight or less from the viewpoint of handling. Furthermore, among those, it is preferably 50% by weight or more to 75% by weight or less, and especially preferably 55% by weight or more to 75% by weight or less.

Furthermore, in the present invention, it is important to keep the concentration of hydrofluoric acid in the hydrofluoric acid aqueous solution 40% by weight or more after reacting at least two kinds of $H_xPO_yF_z$, HF, and MF.r (HF). In the case of less than 40% by weight, an excessive amount of water promotes hydrolysis of the $PF_6$ anion. Therefore, the concentration of hydrofluoric acid in the aqueous solution after the reaction is preferably 40% by weight or more to less than 80% by weight, and especially preferably 45% by weight or more to less than 65% by weight from the viewpoint of yield and handling properties such as filtration. On the other hand, in the above chemical reaction Formula 1, because the $H_xPO_yF_z$ aqueous solution or the HF aqueous solution that are used and a water component that is generated by the reaction are separated to the solid side as crystallization water, the concentration of hydrofluoric acid can be made higher than that before the reaction.

The grade of the above hydrofluoric acid is not especially limited, and an industrial grade, a general grade, a semiconductor grade, etc. in the market can be used as it is or by appropriately adjusting the concentration thereof. Among those, a semiconductor grade that has a lower amount of impurities is preferably used. However, from the viewpoint of the cost, an industrial grade, a general grade, etc. are especially preferable. It is sufficient if each metal impurity is 1 ppm by weight or less as the concentration of impurities.

On the other hand, a production method of MF.r (HF) is not also especially limited, and oxides, hydroxides, carbonates, chlorides, etc. containing M=Li, Na, K, Rb, Cs, and Ag, products produced by reacting $NH_3$ with hydrofluoric acid or ammonium fluoride, or metal fluorides MF.r (HF) (r≧0) produced by excessively reacting these products with hydrofluoric acid are used. In addition, MF.r (HF) that is produced as a by-product due to the reaction of the following chemical reaction Formula 6 may be reused.

$$MPF_6 + HF \rightarrow PF_5 + MF.r\,(HF) \quad \text{(Formula 6)}$$

(wherein, HF is used in an amount of the stoichiometric amount or more)

There are problems that the handling of phosphorus pentachloride and phosphorous pentaoxide is difficult because they are solids having large moisture absorbing property, and especially its workability is poor when loading raw materials into manufacturing facilities, etc., and mechanization is also difficult to be attempted. On the other hand, because LiF, LiF.(HF), NaF, NaF.(HF), KF.(HF), RbF.(HF), CsF, etc. do not absorb moisture as intensely as phosphorous pentachloride and phosphorous pentaoxide and they are crystals having excellent fluidity, loading of the raw materials is easy. Furthermore, both $H_xPO_yF_z$ and HF are liquid (aqueous solution) at room temperature, and comparing to the case of using phosphorous pentachloride and phosphorus pentaoxide as raw materials, they have advantages that their workabilities in loading raw materials into the manufacturing facilities, etc. are remarkably improved and that mechanization can also be attempted easily. As a matter of course, these lead to improved productivity of hexafluorophosphate.

In the above chemical reaction Formula 1 or 3, there are no problems if the addition ratio of HF to $H_xPO_yF_z$ is 1 equivalent or more. However, in a case where the addition ratio is small, because the concentration of hydrofluoric acid after the reaction becomes low, it is preferably 1.5 equivalents or more. The concentration of hydrofluoric acid after the reaction can be increased if the addition ratio is further increased. However, because it becomes industrially uneconomical, it is preferably less than 10 equivalents. On the other hand, because the solubility of the produced $MPF_6$ decreases with an increase of the HF concentration, it is possible to increase the yield. However, because the amount of dissolution of $MPF_6$ increases due to the large amount of HF even if the solubility is low, and the yield decreases, and among those, it is especially preferably 2 equivalents or more to 7.5 equivalents or less.

Further, in the above chemical reaction Formula 2 or 3, the reaction proceeds quantitatively when the addition ratio of MF.r (HF) to $H_xPO_yF_z$ is 1 to 3 equivalents. However, when the addition ratio becomes large, MF.r (HF) becomes a compound having large r by reacting with HF and therefore, the concentration of hydrofluoric acid in the system decreases and the yield also decreases, it is preferably 1.01 to 2 equivalents, and among those it is especially preferably 1.05 to 1.5 equivalents when industrial and economic efficiencies are taken into account.

In the above chemical reaction Formula 1, the adding method of the raw materials is not especially limited, and any of a method of adding a $H_xPO_yF_z$ aqueous solution and a hydrofluoric acid aqueous solution all at once, a method of dropping a $H_xPO_yF_z$ aqueous solution or a hydrofluoric acid aqueous solution at the same time, and a method of placing any one of a $H_xPO_yF_z$ aqueous solution or a hydrofluoric acid aqueous solution in a reactor first and dropping the other aqueous solution may be used. However, in the reaction of a $H_xPO_yF_z$ aqueous solution and a hydrofluoric acid aqueous solution, because heat is hardly generated during the reaction, a method of adding a $H_xPO_yF_z$ aqueous solution and a hydrofluoric acid aqueous solution all at once is preferable when considering productivity.

Further, the adding method of the raw materials in the above chemical reaction Formula 3 is not also especially limited, and any of a method of adding a $H_xPO_yF_z$ aqueous solution in which MF.r (HF) is dissolved and a hydrofluoric acid aqueous solution all at once, a method of dropping a $H_xPO_yF_z$ aqueous solution in which MF.r (HF) is dissolved or a hydrofluoric acid aqueous solution at the same time, and a method of placing any one of a $H_xPO_yF_z$ aqueous solution in which MF.r (HF) is dissolved or a hydrofluoric acid solution in a reactor first and dropping the other aqueous solution may be used. Furthermore, a method of placing MF.r (HF) in a reactor first and adding a $H_xPO_yF_z$ aqueous solution and a hydrofluoric acid aqueous solution into the reactor all at once or a method of placing MF.r (HF) in a reactor first and dropping a $H_xPO_yF_z$ aqueous solution or a hydrofluoric acid aqueous solution into the reactor at the same time may be used. Further, a liquid in which $MPF_6$ is dissolved into these solutions in advance may be used.

Heat is hardly generated during the reaction in the reaction of the $H_xPO_yF_z$ aqueous solution and the hydrofluoric acid aqueous solution, however, because some heat is generated when MF.r (HF) reacts with HF, it is preferable to use a MF.r (HF)/HF aqueous solution in which MF.r (HF) is slowly added into HF that is cooled to 5 to 15° C. while stirring. In the reaction of this MF.r (HF)/HF solution and the $H_xPO_yF_z$ aqueous solution, because heat is hardly generated during the reaction, a method of adding the $H_xPO_yF_z$ aqueous solution and a hydrofluoric acid aqueous solution in which MF.r (HF) is dissolved all at once is preferable when considering productivity.

Furthermore, $MPF_6$ (M=Na, K, Rb, Cs, $NH_4$, and Ag) is synthesized by reacting a $HPF_6.qH_2O$ crystal (solid) that is extracted in the above chemical reaction Formula 2 with MF.r (HF), and the reaction method at this time is not also especially limited. At this time, any of a method of adding any one of water or HF to the $HPF_6.qH_2O$ crystal or MF.k (HF), dissolving it by stirring, and then adding these solutions all at once, dropping these solutions at the same time, or adding one solution into the other solution.

However, because water and HF are produced as a by-product as the reaction proceeds in the same as the chemical reaction Formula 2, solids are placed in the reactor and stirring may be performed without a necessity of adding water or HF. However, an increase of the liquid amount is closely related to the solubility, and because the smaller the liquid amount, the better it is, and among these, a method of placing the solids in the reactor and stirring is the most preferable.

In the above chemical reaction Formulas 1 to 3, the reaction temperature is not especially limited. However, because a hydrolysis reaction that is a reverse reaction occurs in the above chemical reaction Formulas 1 to 3 when the reaction temperature becomes 70° C. or more and a hydrolysis reaction of $PF_6^-$ also occurs in the chemical reaction Formula 2, it causes a decrease of the yield. Further, because scattering of HF occurs when the reaction temperature is high, the reaction is preferably performed at 50° C. or less. Furthermore, because the reaction rate becomes slow in the case of a low temperature, it is preferably −40° C. or more. Further, in the case of considering productivity, it is especially preferable to perform the reaction in the range of −20° C. to +30° C.

In the above chemical reaction Formulas 1 to 3, the crystallization temperature is not also especially limited. The lower it is, the more the yield is improved. However, it leads to an increase of cost in the aspects of incidental facilities and productivity. For this reason, it is preferably −40° C. or more to +30° C. or less, more preferably −20° C. or more to +20° C. or less, and among those, especially preferably −5° C. or more to +20° C. or less. Further, because the solubility of $HPF_6 \cdot qH_2O$ is high, a crystal cannot be obtained at 0° C. or more. That is, in the case of $HPF_6 \cdot qH_2O$, it becomes possible that $HPF_6 \cdot qH_2O$ can be extracted as a crystal by making the concentration of HF after the reaction 40% by weight or more and the temperature 0° C. or less. Then, in the case of performing a crystallization of $HPF_6 \cdot qH_2O$, it is very important to make the temperature −50° C. or more to 0° C. or less, and among those, preferably −40° C. or more to −5° C. or less.

The reaction or crystallization time in the chemical reaction Formulas 1 to 3 is not especially limited. However, in a case where it is short, there is a possibility that the yield decreases. On the other hand, in a case where it is long, the productivity decreases. For this reason, the reaction or crystallization time is 0.5 hours or more and less than 72 hours, preferably 1 hour or more to 48 hours or less, more preferably 1.5 hours or more to 8 hours or less, and among those, especially preferably 2 hours or more to 6 hours or less.

It is a feature of the present invention to extract a $HPF_6 \cdot qH_2O$ crystal (solid) from the reaction system to outside of the system by crystallization for example after the reaction in the chemical reaction Formula 1. However, q is 1 or more, preferably 2 or more, and more preferably 6 or more. That is, because this $HPF_6 \cdot qH_2O$ crystal (solid) is a hydrate, the moisture in the system shifts to the crystal side and the concentration of hydrofluoric acid in the solution can be increased. Furthermore, by adding HF having high concentration into this filtrate, it can be an initial concentration or can be made close to the initial concentration, a mother liquid can be continuously used in the reaction of the next batch, and therefore a cost reduction becomes possible.

Stirring is preferably performed during the reaction. However, the level of stirring is not especially limited.

The $HPF_6 \cdot qH_2O$ or the $MPF_6$ that is obtained by the above set of operations is subjected to solid-liquid separation. An example of the method of solid-liquid separation is a filtration, and a known general filtration method such as natural filtration, pressurized filtration, and centrifugal filtration can be adopted as the filtration method.

After the solid-liquid separation in the chemical reaction formula 2 or 3, the purity of the $MPF_6$ is preferably increased by a performing washing. Known methods such as a method of performing washing by dispersing the $MPF_6$ into a washing agent again and a method of performing washing by introducing a washing agent directly into a separation apparatus and contacting with the $MPF_6$ can be used alone or in combination as a washing operation. Further, there is a case where the filtrate after filtration contains an excessive amount of $MPF_6$ salt solution or a large amount of acid. In this case, if distillation, etc. is performed on the filtrate and a $MPF_6$ salt solution or acid is recovered, the double effects of cost reduction due to the load reduction of waste water treatment and of the recovery of valuable materials can be obtained.

Here, the washing agent is not especially limited, and any of anhydrous HF, highly concentrated HF, diluted HF, pure water, etc. may be used. Furthermore, for the purpose of neutralizing acid, the washing may be performed with an alkaline salt of the same cation (for example, in the case of synthesizing $KPF_6$, $K_2CO_3$, $KHCO_3$, etc. is used). As described above, by performing alkaline neutralization, influences of erosion by acid, contamination of metal impurities to the product, etc. in the latter step can be suppressed.

Further, the temperature during the filtration and washing is not also especially limited. However, it is performed at −40° C. or more to +30° C. or less, more preferably −20° C. or more to +20° C. or less, and among those, especially preferably −5° C. or more to +20° C. or less.

The $MPF_6$ that is obtained by the solid-liquid separation is preferably dried. Examples of the drying method include air drying, warm heat drying, and vacuum drying. The drying time is not especially limited. However, it is generally 0.5 to 72 hours. The drying is preferably performed at a drying temperature of less than 120° C. When it is performed at a temperature of 120° C. or more, drying facilities become expensive, a large heat capacity becomes necessary, and the production cost becomes high. Further, because the higher the temperature, the more possibility of the $MPF_6$ being decomposed by a small amount of moisture, and therefore the drying is preferably performed at 85 to 110° C.

$MPF_6$ having a moisture content of 1000 ppm by weight or less can be manufactured simply with the above method. Further, because inexpensive raw materials can be used in this method and the manufacturing method is simple, cost reduction can be attempted.

Furthermore, according to the following chemical reaction Formula 7, a salt exchange may be performed on the hexafluorophosphate ($MPF_6$: M=Li, Na, K, Rb, Cs, $NH_4$, and Ag) that was obtained with the method of the above chemical reaction Formulas 1 to 3.

$MPF_6 + JF \cdot k\ (HF) \rightarrow JPF_6 + MF \cdot k\ (HF)$     (Formula 7)

(wherein, J=Li, Na, K, Rb, Cs, $NH_4$, and Ag, and $k \geq 0$)

Here, the solvent that is used in the salt exchange is not especially limited, and any of anhydrous HF, highly concentrated HF, diluted HF, pure water, organic solvents, etc. may be used. Among these solvents, anhydrous HF and highly concentrated HF are especially preferable.

Furthermore, in the chemical reaction Formula 7, the ratio of the JF·k (HF) to the $MPF_6$ is preferably 1 to 2 equivalents. However, because unreacted JF·k (HF) is mixed into $JPF_6$ that is a product when the ratio increases, the ratio is especially preferably 1.0 to 1.1 equivalents.

The amount of the solvent that is used is not also especially limited. However, when the amount of the solvent increases, the amount of dissolution increases and the yield decreases. However, when the amount of the solvent is small, there is a case where unreacted JF·k (HF) or MF·k (HF) that is produced as a by-product is mixed into $JPF_6$ that is a product. Because of this, the amount of the solvent is preferably 0.5 to 10 times, and especially preferably 1 to 5 times the weight of $MPF_6$.

In the salt exchange, the adding method of raw materials is not also especially limited. Examples of the method include a method in which a solution having $MPF_6$ or JF·k (HF) being dissolved in a solvent is added all at once or is dropped at the same time, and a method in which one solution is added to the other solution. Furthermore, a method of placing a solvent into a reactor first and slowly adding $MPF_6$ or JF·k (HF) thereinto may be used. Furthermore, it may be a reverse operation thereof. However, the reaction is preferably performed after dissolving the raw materials once as a method for not being incorporated the unreacted products of the raw materials, etc. into $JPF_6$.

The reaction, crystallization, filtration, washing, and drying methods are not also especially limited, and they can be performed under the conditions described above.

In the case of performing the salt exchange on the hexafluorophosphate that was obtained with the above chemical reaction Formulas 1 to 3 according to the chemical reaction formula 7, $MPF_6$ having a moisture content of 1000 ppm by weight or less can be manufactured simply.

Because a hydrofluoric acid aqueous solution is used in all of the set of operations, a container made of a fluorine resin, vinylchloride, polyethylene, or a container lined with these is preferably used.

EXAMPLES

Below, the preferred examples of this invention will be described illustratively in detail. However, the materials, the compounding amounts, etc. that are described in these examples are not for the purpose of limiting the scope of this invention to those as long as there is especially no limiting description, and they are only illustrative examples.

Example 1

160 g of acid potassium fluoride (KF.(HF)) and 700 g of 75% by weight of hydrofluoric acid (HF) in a semiconductor grade were placed in a 3 L reaction vessel made of a fluorine resin (PFA) together with a rotator, and the KF.(HF) was dissolved while stirring under an ice bath. Furthermore, 175 g of 85% by weight of phosphoric acid ($H_3PO_4$) was weighted to put in a separatory funnel, it was slowly dropped over 30 minutes while cooling with an ice bath, and the reaction was performed while stirring for 6 hours.

Thereafter, it was cooled to −5° C. and crystallization was performed for 24 hours. Next, the obtained precipitate was filtered by suction and filtration. At this time, when the HF concentration of the filtrate was quantitatively analyzed, it was 55% by weight. On the other hand, the recovered crystal was washed with 400 g of pure water. Thereafter, drying was performed at 105° C. for 12 hours. The amount of the obtained crystal was 156 g (yield 56%). Furthermore, when XRD measurement of the obtained crystal was performed, it was found to be $KPF_6$. Further, when the moisture content of the obtained $KPF_6$ was measured with a moisture meter, it was 350 ppm by weight (as a result of performing ion chromatography of the filtrate, only $F^-$ anion and $PF_6^-$ anion were detected. The rate of the material that could be extracted as a crystal was 56%. However, because 100 g of $KPF_6$ was dissolved in the washed filtrate after washing with pure water, it was found that the reaction was approximately quantitatively proceeding.)

Example 2

The filtrate of Example 1 was completely concentrated at 120° C. over 24 hours. The liquid after concentration had slight viscosity and it was a cloudy liquid. This liquid was added to the 3 L of reaction vessel made of PFA, and 200 g of 75% by weight of $H_3PO_4$ was added and dissolved. On the other hand, 550 g of 75% by weight of HF in a semiconductor grade was placed in a separate container, 145 g of KF.(HF) was slowly added while cooling with an ice bath, and it was dissolved while stirring. Each of this hydrofluoric acid aqueous solution and phosphoric acid solution was transferred into a separatory funnel, and dropping was performed at the same time over 15 minutes while stirring under an ice bath. This solution was cooled to −40° C., and crystallization was performed for 48 hours.

Next, the obtained precipitate was filtered by suction and filtration. At this time, when the HF concentration of the filtrate was quantitatively analyzed, it was 48% by weight. On the other hand, the recovered crystal was washed with 400 g of pure water. Thereafter, drying was performed at 105° C. for 8 hours. The amount of the obtained crystal was 155 g. Furthermore, when XRD measurement of the obtained crystal was performed, it was found to be $KPF_6$. According to the above description, it can be found out that the yield was 55% (the amount of $KPF_6$ that was dissolved in the washing liquid was not included). Further, when the moisture content of the obtained $KPF_6$ was measured with a moisture meter, it was 500 ppm by weight.

Example 3

160 g of KF.(HF) and 940 g of 55% by weight of HF in a semiconductor grade were placed in a 3 L of reaction vessel made of PFA together with a rotator, and the KF.(HF) was dissolved while stirring under an ice bath. Furthermore, 175 g of 85% by weight of $H_3PO_4$ was weighed to put in a separate container, and a phosphoric acid aqueous solution was added all at once while stirring in a water bath of 20° C. The reaction and crystallization were performed as it is for 4 hours. Next, the obtained precipitate was filtered by suction and filtration. At this time, when the HF concentration of the filtrate was quantitatively analyzed, it was 42% by weight. On the other hand, the recovered crystal was washed with 400 g of pure water. Thereafter, drying was performed at 105° C. for 24 hours. Furthermore, when XRD measurement of the obtained crystal was performed, it was found to be $KPF_6$. Because the amount of the obtained crystal was 53 g, the yield was 19% (the amount of $KPF_6$ that was dissolved in the washing liquid was not included). Furthermore, when the moisture content of the obtained $KPF_6$ was measured with a moisture meter, it was 200 ppm by weight.

Example 4

80 g of acid ammonium fluoride ($NH_4F.(HF)$) and 115 g of 75% by weight of $H_3PO_4$ were placed in a 3 L of reaction vessel made of PFA together with a rotator, and 500 g of 80% by weight of HF in a semiconductor grade was slowly added while stirring under an ice bath. The reaction and crystallization were performed as it is for 24 hours. Next, the obtained precipitate was filtered by suction and filtration. At this time, when the HF concentration of the filtrate was quantitatively analyzed, it was 63% by weight. On the other hand, the recovered crystal was washed with 400 g of pure water. Thereafter, drying was performed at 95° C. for 24 hours. Furthermore, when XRD measurement of the obtained crystal was performed, it was found to be $NH_4PF_6$. Because the amount of the obtained crystal was 82 g, the yield was 58% (the amount of $NH_4PF_6$ that was dissolved in the washing liquid was not included). Furthermore, when the moisture content of the obtained $NH_4PF_6$ was measured with a moisture meter, it was 800 ppm by weight.

Example 5

210 g of cesium fluoride (CsF) and 700 g of 75% by weight of HF in a semiconductor grade were placed in a 3 L of reaction vessel made of PFA together with a rotator, and the CsF was dissolved while stirring under an ice bath. Furthermore, 175 g of 85% by weight of $H_3PO_4$ was weighed to put in a separatory funnel, it was slowly dropped over 30 minutes while cooling with an ice bath, and the reaction was performed while stirring for 12 hours. Thereafter, it was cooled to −5° C. and crystallization was performed for 36 hours. Next, the obtained precipitate was filtered by suction and filtration. At this time, when the HF concentration of the filtrate was quantitatively analyzed, it was 55% by weight. On the other hand, the recovered crystal was washed with 400 g of pure water. Thereafter, drying was performed at 105° C. for 12 hours. When XRD measurement of the obtained crystal was performed, it was found to be $CsPF_6$. Because the amount of the obtained crystal was 368 g, the yield was 96% (the amount of $CsPF_6$ that was dissolved in the washing liquid was not included). Furthermore, when the moisture content of the obtained $CsPF_6$ was measured with a moisture meter, it was 200 ppm by weight.

Example 6

A metaphosphoric acid aqueous solution was prepared by dispersing 120 g of metaphosphoric acid ($HPO_3$) in 50 g of pure water. Furthermore, 160 g of KF.(HF) and 700 g of 75% by weight of HF in an industrial grade were placed in a 3 L of reaction vessel made of PFA together with a rotator, and the KF.(HF) was dissolved while stirring under an ice bath. Each of these solutions was transferred into a separatory funnel, and dropping was performed at the same time into the 3 L of reaction vessel made of PFA over 15 minutes in a water bath of 20° C., and the reaction was performed while stirring for 1 hour. Thereafter, it was cooled to 10° C. and crystallization was performed for 3 hours. Next, the obtained precipitate was filtered by suction and filtration. At this time, when the HF concentration of the filtrate was quantitatively analyzed, it was 55% by weight. On the other hand, the recovered crystal was washed with 400 g of pure water. Thereafter, drying was performed at 100° C. for 18 hours. When XRD measurement of the obtained crystal was performed, it was found to be $KPF_6$. Because the amount of the obtained crystal was 134 g, the yield was 48% (the amount of $KPF_6$ that was dissolved in the washing liquid was not included). Furthermore, when the moisture content of the obtained $KPF_6$ was measured with a moisture meter, it was 420 ppm by weight.

Example 7

600 g of 80% by weight of HF in an industrial grade and a rotator were placed in a 3 L of reaction vessel made of PFA, 120 g of phosphorous oxyfluoride ($POF_3$) was absorbed while stirring in an ice bath. 60 g of Sodium fluoride (NaF) was slowly added to the solution in which $POF_3$ was dissolved, and it was dissolved while stirring. Cooling and crystallization were performed on this solution at −20° C. for 48 hours. Next, the obtained precipitate was filtered by suction and filtration. At this time, when the HF concentration of the filtrate was quantitatively analyzed, it was 73% by weight. On the other hand, the recovered crystal was returned to the 3 L of reaction vessel made of PFA, it was dispersed by adding 100 g of anhydrous HF to the reaction vessel, and stirring was performed for 30 minutes. Thereafter, it was kept still, a supernatant liquid was taken out, and air drying was performed by introducing $N_2$ to a bottle at 3 L/min. Thereafter, drying was performed at 100° C. for 6 hours. When XRD measurement of the obtained crystal was performed, it was found to be $NaPF_6$. Because the amount of the obtained crystal was 62 g, the yield was 32% (the amount of $NaPF_6$ that was dissolved in anhydrous HF in the washing liquid was not included). Furthermore, when the moisture content of the obtained $NaPF_6$ was measured with a moisture meter, it was 650 ppm by weight.

Example 8

2000 g 75% by weight of HF in a semiconductor grade was placed in a 5 L of reaction vessel made of PFA together with a rotator, it was stirred under an ice bath. Furthermore, 420 g of 85% by weight of $H_3PO_4$ was weighed to put in a separatory funnel, it was dropped over 15 minutes while cooling with an ice bath, and the reaction was performed while stirring for 3 hours. Thereafter, this solution was cooled to −40° C. and crystallization was performed for 48 hours. Next, the obtained precipitate was filtered by suction and filtration. The weight of the crystal in a wet condition was 1080 g. In the case of $HPF_6$ (no crystallization water), the 100% yield was 532 g. However, the actual weight is obviously larger even if the water content and the HF content are added. According to the above description, it is considered to be in a form of $HPF_6.qH_2O$ having crystallization water. On the other hand, when the HF concentration of the filtrate was quantitatively analyzed, it was 71% by weight. In a case where water did not shift to the crystal side as crystallization water, the HF concentration was calculated to be 56% by weight. However, because it was actually 71% by weight, it was in a form of containing crystal water as expected, and q is considered to be 2 or more.

Next, a NaF/HF solution was prepared by placing 330 g of NaF in a 2 L of reaction vessel made of PFA and adding 1050 g of anhydrous HF to the reaction vessel while cooling with an ice bath. On the other hand, the entire amount of the $HPF_6$ obtained above was placed in a 3 L of reaction vessel made of PFA, and the prepared NaF/HF solution was added over 20 minutes while stirring under an ice bath. After the reaction, it was cooled to −10° C. and the crystallization was performed for 48 hours. Next, a supernatant liquid in the 3 L of reaction vessel made of PFA was slowly taken out, and a solid-liquid separation was performed. After the separation, $N_2$ was introduced into a bottle at 3 L/min, and air drying was performed. Thereafter, drying was performed at 105° C. for 3 hours. When XRD measurement of the obtained crystal was performed, it was found to be $NaPF_6$. Because the amount of the obtained crystal was 205 g, the yield was 33%. Further, when the moisture content of the obtained $NaPF_6$ was measured with a moisture meter, it was 420 ppm by weight.

Example 9

In order to reuse HF, 840 g of 75% by weight of HF was prepared by adding 140 g of anhydrous HF to the 700 g of 71% by weight of HF filtrate that was recovered in Example 8 in a 3 L of reaction vessel made of PFA. Furthermore, 120 g of 85% by weight of $H_3PO_4$ was weighed to put in a separate polyethylene container, it was added into hydrofluoric acid all at once while stirring under an ice bath, and the stirring was performed for 30 minutes while cooling with an ice bath. Thereafter, this solution was cooled to −20° C. and crystallization was performed for 24 hours. Next, the obtained precipitate was filtered by suction and filtration. The weight of the crystal in a wet condition was 250 g. The entire amount of this crystal in a wet condition was transferred into a 1 L of reaction vessel made of PFA with a rotator. On the other hand, when the HF concentration of the filtrate was quantitatively analyzed, it was 72% by weight.

Next, the HF solution after performing the reaction of $KPF_6+HF \rightarrow PF_5+KF.(HF)$ was completely concentrated, dried, and hardened, and 125 g of white powders were recovered. When XRD measurement of this powder was performed, it was found to be a mixture of $KPF_6$ and KF.(HF), and the powder contained 90% of KF.(HF). The obtained $KPF_6$/KF.(HF) mixture was slowly added to the above 1 L of reaction vessel made of PFA, and the reaction was performed at 20° C. for 48 hours. The stirring was difficult in the initial stage of the reaction because it was a reaction between solids.

However, after 30 minutes of the reaction, $H_2O/HF$ was gradually generated from the crystal, and the stirring could be easily performed.

Next, the obtained precipitate was filtered by suction and filtration. The recovered crystal was washed with 400 g of pure water. Thereafter, drying was performed at 105° C. for 24 hours. When XRD measurement of the obtained crystal was performed, it was found to be $KPF_6$. Because the amount of the obtained crystal was 105 g, the yield was 55% (the amount of $KPF_6$ that was dissolved in the washing liquid was not included). Further, when the moisture content of the obtained $KPF_6$ was measured with a moisture meter, it was 400 ppm by weight.

Comparative Example 1

120 g of KF.(HF) and 600 g of 50% by weight of HF in an industrial grade were placed in a 3 L of reaction vessel made of PFA together with a rotator, and the KF.(HF) was dissolved while stirring under an ice bath. Furthermore, 120 g of 85% by weight of $H_3PO_4$ was weighed to put in a separate container, and a phosphoric acid aqueous solution was added all at once while stirring under an ice bath. The reaction and crystallization were performed as it is for 48 hours. However, the crystal did not precipitate at all. When the HF concentration of the filtrate was measured, it was 36% by weight. Furthermore, anion analysis was performed by ion chromatography, $PF_6^-$ anion was not detected at all, and only oxyfluorophosphate anion such as $HPO_2F_2^-$ and $PO_4^{3-}$ were detected.

Conventional Example

The present example is a method described in Patent Document 4.

790 g of Polyphosphoric acid (9.4 mol) was added to a 5 L of reaction vessel made of PFA, and 1235 g of anhydrous HF (61.7 mol) was added while keeping at 25° C. by cooling under stirring. Additional stirring was performed at 25° C. for 3 hours, and then it was cooled to −40° C., and crystallization was performed for 24 hours. However, a crystal was not obtained. Furthermore, when the HF concentration of the filtrate was measured, it was 11% by weight.

From the above description, the simple synthesis of $MPF_6$ is possible by making the HF concentration after the reaction 40% by weight or more. Furthermore, in any of the methods, only at least three kinds of raw materials of a $H_xPO_yF_z$ aqueous solution, a hydrofluoric acid aqueous solution, and MF.r (HF) were used. In a case where z=0, it is a phosphoric acid aqueous solution, and 75% by weight of $H_3PO_4$ is distributed for adding to food in a large amount. Furthermore, the fluoric acid aqueous solution is also used for semiconductor or industrial uses in a very large amount. In addition, because MF.r (HF) can be synthesized easily by the reaction of fluoric acid with oxides, hydroxides, carbonates, chlorides, etc., any of the raw materials can be easily obtained and it is a superior method compared to the conventional methods.

Industrial Applicability

The $MPF_6$ that is obtained in the present invention can be used as an electrolyte of a battery which is further expected in development for a hybrid car in the future.

The hexafluorophosphate manufactured in the present invention can be used as an electrolyte for a battery, a catalyst for an organic synthesis reaction, etc.

Hexafluorophosphate $MPF_6$ (M=Li, Na, K, etc.) is used as the electrolyte of a battery. Furthermore, in the case of M=Ag, it is utilized as a counter ion that generates acid necessary for an initiation reaction in photo polymerization and a growth reaction. Furthermore, in the case of $M=NH_4$, it is useful as a raw material that is used in the manufacturing of medicine intermediates.

The invention claimed is:

1. A manufacturing method of hexafluorophosphate ($MPF_6$: M is at least one kind selected from the group consisting of Li, Na, K, Rb, Cs, $NH_4$, and Ag) comprising steps of:
   providing at least a $H_xPO_yF_z$ aqueous solution, a hydrofluoric acid aqueous solution, and MF.r (HF) as raw materials, wherein, $r \geq 0$, $0 \leq x \leq 3$, $0 \leq y \leq 4$, and $0 \leq z \leq 6$; and
   producing the hexafluorophosphate from the raw materials.

2. The manufacturing method of hexafluorophosphate according to claim 1, wherein $MPF_6$ is synthesized by reacting the $H_xPO_yF_z$ aqueous solution with the hydrofluoric acid aqueous solution according to Formula 1, extracting a crystal of a hexafluorophosphoric acid hydrate ($HPF_6 \cdot qH_2O$) as a solid once, and then reacting the extracted $HPF_6 \cdot qH_2O$ with MF.r (HF) according to Formula 2, $H_xPO_yF_z + pHF \rightarrow HPF_6 \cdot qH_2O$ (Formula 1)

(wherein, $p>0, p+z>6$, and $q \geq 1$)

$HPF_6 \cdot qH_2O + MF.r\ (HF) \rightarrow MPF_6 + (r+1)HF + qH_2O$ (Formula 2).

3. The manufacturing method of hexafluorophosphate according to claim 1, wherein $MPF_6$ is synthesized by reacting the $H_xPO_yF_z$ aqueous solution, the hydrofluoric acid aqueous solution, and MF.r(HF) all at once according to Formula 3, $MF.r\ (HF) + H_xPO_yF_z + sHF \rightarrow MPF_6 + yH_2O$ (Formula 3)

(wherein, s is 1 or more, and $0 < y \leq 4$).

4. The manufacturing method of hexafluorophosphate according to claim 1, wherein the $H_xPO_yF_z$ has a concentration of 50 to 98% by weight in the $H_xPO_yF_z$ aqueous solution.

5. The manufacturing method of hexafluorophosphate according to claim 1, wherein the $H_{x1}PO_yF_z$ has a concentration of 75% by weight to 85% by weight in the $H_xPO_yF_z$ aqueous solution.

6. The manufacturing method of hexafluorophosphate according to claim 1, wherein the hydrofluoric acid in the hydrofluoric acid aqueous solution used has a concentration of 40% by weight or more.

7. The manufacturing method of hexafluorophosphate according to claim 1, wherein the hydrofluoric acid in the hydrofluoric acid aqueous solution used has a concentration of 50% by weight to 75% by weight.

8. The manufacturing method of hexafluorophosphate according to claim 1, wherein the concentration of the hydrofluoric acid in the hydrofluoric acid aqueous solution after reacting at least two out of: the $H_xPO_yF_z$ aqueous solution; the HF aqueous solution; and MF.r (HF) is kept at 40% by weight or more.

9. The manufacturing method of hexafluorophosphate according to claim 8, wherein the concentration of the hydrofluoric acid in the hydrofluoric acid aqueous solution after reacting at least two out of: the $H_xPO_yF_z$ aqueous solution; the HF aqueous solution; and MF.r (HF) is kept at 45% by weight or more and less than 65% by weight.

10. The manufacturing method of hexafluorophosphate according to claim 1, wherein in the producing step, $HPF_6 \cdot qH_2O$ is crystallized by reacting the $H_xPO_yF_z$ aqueous solution and the hydrofluoric acid aqueous solution.

11. The manufacturing method of hexafluorophosphate according to claim 10, wherein the crystallization is performed at −50° C. or more to 0° C. or less.

* * * * *

UNITED STATES PATENT AND TRADEMARK OFFICE
CERTIFICATE OF CORRECTION

PATENT NO. : 8,383,075 B2
APPLICATION NO. : 12/525900
DATED : February 26, 2013
INVENTOR(S) : Waki et al.

It is certified that error appears in the above-identified patent and that said Letters Patent is hereby corrected as shown below:

On the Title page in the Abstract, change "MF.r (HF)" to --MF·r (HF)--.

In the Specification:

In column 1 at line 30, change "DF.c (HF)" to --DF· (HF)--.

In column 1 at line 43, change "(DC or DF.c (HF))" to --(DC or DF·c (HF))--.

In column 1 at line 61, change "$NaPF_6.H_2O$" to --$NaPF_6·H_2O$--.

In column 1 at line 64, change "$NaPF_6.H_2O$" to --$NaPF_6·H_2O$--.

In column 2 at line 34, change "rubidiumpolyphosphate," to --rubidium polyphosphate,--.

In column 2 at lines 54 and 55, change "$HPF_6.6H_2O$, $HPF_6.4H_2O$, and $HPF_6.2H_2O$." to --$HPF_6·6H_2O$, $HPF_6·4H_2O$, and $HPF_6·2H_2O$.--.

In column 3 at line 18, change "MF.r (HF)" to --MF·r (HF)--.

In column 3 at line 40, change "MF.r (HF)" to --MF·r (HF)--.

In column 3 at line 51, change "($HPF_6.qH_2O$)" to --($HPF_6·qH_2O$)--.

In column 3 at line 54, change "$HPF_6.qH_2O$ with MF.r (HF)" to --$HPF_6·qH_2O$ with MF·r (HF)"--.

In column 3 at line 58, change "$HPF_6.qH_2O$" to --$HPF_6·qH_2O$--.

In column 3 at line 59, change "$HPF_6.qH_2O$+MF.r (HF)" to --$HPF_6·qH_2O$+MF·r (HF)--.

In column 3 at line 62, change "MF.r (HF)" to --MF·r (HF)--.

In column 3 at line 65, change "MF.r (HF)" to --MF·r (HF)--.

In column 4 at line 45, change "MF.r (HF)" to --MF·r (HF)--.

In column 5 at line 1, change "MF.r (HF)" to --MF·r (HF)--.

In column 5 at line 5, change "MF.r (HF)" to --MF·r (HF)--.

Signed and Sealed this
Twenty-ninth Day of October, 2013

Teresa Stanek Rea
*Deputy Director of the United States Patent and Trademark Office*

In column 5 at line 7, change "MF.r (HF)" to --MF·r (HF)--.

In column 5 at line 11, change "MF.r (HF)" to --MF·r (HF)--.

In column 5 at line 20, change "LiF.(HF), NaF, NaF.(HF), KF.(HF), RbF.(HF)," to --LiF·(HF), NaF, NaF·(HF), KF·(HF), RbF·(HF),--.

In column 5 at line 50, change "MF.r (HF)" to --MF·r (HF)--.

In column 5 at line 51, change "MF.r (HF)" to --MF·r (HF)--.

In column 6 at line 8, change "MF.r (HF)" to --MF·r (HF)--.

In column 6 at line 10, change "MF.r (HF)" to --MF·r (HF)--.

In column 6 at line 13, change "MF.r (HF)" to --MF·r (HF)--.

In column 6 at line 15, change "MF.r (HF)" to --MF·r (HF)--.

In column 6 at line 18, change "MF.r (HF)" to --MF·r (HF)--.

In column 6 at line 26, change "MF.r (HF) reacts with HF, it is preferable to use a MF.r(HF)/HF" to --MF·r (HF) reacts with HF, it is preferable to use a MF·r(HF)/HF--.

In column 6 at line 27, change "MF.r (HF)" to --MF·r (HF)--.

In column 6 at line 28, change "15° C." to --15° C--.

In column 6 at line 29, change "MF.r (HF)/HF" to --MF·r (HF)/HF--.

In column 6 at line 32, change "MF.r (HF)" to --MF·r (HF)--.

In column 6 at line 37, change "MF.r (HF)" to --MF·r (HF)--.

In column 6 at line 40, change "MF.k (HF)" to --MF·k (HF)--.

In column 6 at line 56, change "70° C. or more" to --70° C or more--.

In column 6 at line 60, change "50° C. or less" to --50° C or less--.

In column 6 at line 62, change "-40° C. or more" to -- -40° C or more--.

In column 6 at line 64, change "-20° C. to" to -- -20° C to--.

In column 7 at line 2, change "-40° C. to" to -- -40° C to--.

In column 7 at line 3, change "+30° C. or less, more preferable -20° C. or more to +20° C." to --+30° C or less, more preferable -20° C or more to +20° C--.

In column 7 at line 4, change "-5° C." to -- -5° C--.

In column 7 at line 5, change "+20° C." to --+20° C--.

In column 7 at line 6, change "HPF$_6$.qH$_2$0" to --HPF$_6$·qH$_2$0--.

In column 7 at line 6, change "0° C." to --0° C--.

In column 7 at line 7, change "HPF$_6$.qH$_2$0" to --HPF$_6$·qH$_2$0--.

In column 7 at line 8, change "HPF$_6$.qH$_2$0" to --HPF$_6$·qH$_2$0--.

In column 7 at line 10, change "0° C." to --0° C--.

CERTIFICATE OF CORRECTION (continued)
U.S. Pat. No. 8,383,075 B2

In column 7 at line 11, change "HPF$_6$.qH$_2$0" to --HPF$_6$·qH$_2$0--.

In column 7 at line 12, change "-50° C. or more to 0° C." to -- -50° C or more to 0° C--.

In column 7 at line 13, change "-40° C. or more to -5° C." to -- -40° C or more to -5° C--.

In column 7 at line 25, change "HPF$_6$.qH$_2$0" to --HPF$_6$·qH$_2$0--.

In column 7 at line 29, change "HPF$_6$.qH$_2$0" to --HPF$_6$·qH$_2$0--.

In column 7 at line 39, change "HPF$_6$.qH$_2$0" to --HPF$_6$·qH$_2$0--.

In column 8 at line 3, change "C. or more to +30° C. or less, more preferably -20° C." to --C or more to +30° C or less, more preferably -20° C--.

In column 8 at line 4, change "20° C." to --20° C--.

In column 8 at line 5, change "C. or more to +30° C." to --C or more to +30° C--.

In column 8 at line 12, change "120° C." to --120° C--.

In column 8 at line 30, change "MPF$_6$+JF.k (HF)→JPF$_6$+MF.k (HF)" to --MPF$_6$+JF·k (HF)→JPF$_6$+MF·k (HF)--.

In column 8 at lines 38, change "JF.k (HF)" to --JF·k (HF)--.

In column 8 at lines 39, change "JF.k (HF)" to --JF·k (HF)--.

In column 8 at line 46, change "JF.k (HF) or MF.k (HF)" to --JF·k (HF) or MF·k (HF)--.

In column 8 at line 52, change "JF.k (HF)" to --JF·k (HF)--.

In column 8 at line 56, change "JF.k (HF)" to --JF·k (HF)--.

In column 9 at line 19, change "KF.(HF)" to --KF·(HF)--.

In column 9 at line 22, change "KF.(HF)" to --KF·(HF)--.

In column 9 at line 28, change "-5° C." to -- -5° C--.

In column 9 at line 34, change "105° C." to --105° C--.

In column 9 at line 50, change "120° C." to --120° C--.

In column 9 at line 55, change "KF.(HF)" to --KF·(HF)--.

In column 9 at line 61, change "-40° C." to -- -40° C--.

In column 9 at line 67, change "105° C." to --105° C--.

In column 10 at line 12, change "KF.(HF)" to --KF·(HF)--.

In column 10 at line 14, change "KF.(HF)" to --KF·(HF)--.

In column 10 at line 24, change "105° C." to --105° C--.

In column 10 at line 35, change "(NH$_4$F.(HF))" to --(NH$_4$F·(HF))--.

In column 10 at line 45, change "95° C." to --95° C--.

In column 10 at line 64, change "-5° C." to -- -5° C--.

In column 11 at line 2, change "105° C." to --105° C--.

CERTIFICATE OF CORRECTION (continued)
U.S. Pat. No. 8,383,075 B2

In column 11 at line 15, change "KF.(HF)" to --KF·(HF)--.

In column 11 at line 18, change "KF.(HF)" to --KF·(HF)--.

In column 11 at line 22, change "20° C." to --20° C--.

In column 11 at line 23, change "10° C." to --10° C--.

In column 11 at line 29, change "100° C." to --100° C--.

In column 11 at line 45, change "-20° C." to -- -20° C--.

In column 11 at line 55, change "100° C." to --100° C--.

In column 12 at lines 5-6, change "-40° C." to -- -40° C--.

In column 12 at line 13, change "HPF$_6$.qH$_2$0" to --HPF$_6$·qH$_2$0--.

In column 12 at line 28, change "-10° C." to -- -10° C--.

In column 12 at line 33, change "105° C." to --105° C--.

In column 12 at line 50, change "-20° C." to -- -20° C--.

In column 12 at line 59, change "KF.(HF)" to --KF·(HF)--.

In column 12 at lines 62, change "KF.(HF)" to --KF·(HF)--.

In column 12 at lines 63, change "KF.(HF)" to --KF·(HF)--.

In column 12 at lines 64, change "KF.(HF)" to --KF·(HF)--.

In column 12 at line 66, change "20° C." to --20° C--.

In column 13 at line 6, change "105° C." to --105° C--.

In column 13 at line 17, change "KF.(HF)" to --KF·(HF)--.

In column 13 at line 19, change "KF.(HF)" to --KF·(HF)--.

In column 13 at lines 37, change "25° C." to --25° C--.

In column 13 at lines 38, change "25° C." to --25° C--.

In column 13 at line 39, change "-40° C." to -- -40° C--.

In column 13 at line 52, change "MF.r (HF)" to --MFr· (HF)--.

In the Claims:

In column 14 at line 10, change "MF.r (HF)" to --MF·r (HF)--.

In column 14 at lines 18, change "HPF$_6$.qH$_2$0" to --HPF$_6$·qH$_2$0--.

In column 14 at lines 19, change "HPF$_6$.qH$_2$0" to --HPF$_6$·qH$_2$0--.

In column 14 at line 20, change "MF.r (HF)" to --MF·r (HF)--.

In column 14 at line 21, change "HPF$_6$.qH$_2$0" to --HPF$_6$·qH$_2$0--.

In column 14 at line 24, change "HPF$_6$.qH$_2$0" to --HPF$_6$·qH$_2$0--.

In column 14 at line 24, change "MF.r (HF)" to --MF·r (HF)--.

CERTIFICATE OF CORRECTION (continued)
U.S. Pat. No. 8,383,075 B2

In column 14 at line 28, change "MF.r (HF)" to --MF·r (HF)--.

In column 14 at line 30, change "MF.r(HF)" to --MF·r (HF)--.

In column 14 at line 33, change "$H_xPO_yF_Z$" to --$H_xPO_yF_z$--.

In column 14 at line 36, change "$H_{xl\ POy}F_z$" to --$H_xPO_yF_z$--.

In column 14 at line 50, change "MF.r (HF)" to --MF·r (HF)--.

In column 14 at line 56, change "MF.r (HF)" to --MF·r (HF)--.

In column 14 at line 60, change "$HPF_6.qH_2 0$" to --$HPF_6·qH_2 0$--.

In column 14 at line 64, change "50° C." to --50° C--.

In column 14 at line 64, change "0° C." to --0° C--.